United States Patent [19]
Klein

[11] Patent Number: 5,418,087
[45] Date of Patent: May 23, 1995

[54] PLANAR METAL GAS CELL

[75] Inventor: Glenn C. Klein, Alachua, Fla.

[73] Assignee: Saft America, Inc., Valdosta, Ga.

[21] Appl. No.: 102,163

[22] Filed: Aug. 4, 1993

[51] Int. Cl.⁶ ............................................. H01M 12/06
[52] U.S. Cl. ........................................ 429/101; 429/164;
429/166; 429/167; 429/170; 429/208
[58] Field of Search ................. 429/27, 101, 164, 170,
429/166, 167, 208

[56] References Cited

U.S. PATENT DOCUMENTS

| | | | |
|---|---|---|---|
| 4,404,266 | 9/1983 | Smilanich | 429/27 |
| 4,517,264 | 5/1985 | Miller et al. | 429/27 |
| 5,168,017 | 12/1992 | Jones et al. | 429/101 |
| 5,225,295 | 7/1993 | Lim et al. | 429/101 |

Primary Examiner—Prince Willis, Jr.
Assistant Examiner—M. Nuzzolillo
Attorney, Agent, or Firm—Sughrue, Mion, Zinn, Macpeak & Seas

[57] ABSTRACT

A small to miniature pressurized secondary cell of planar configuration has a case comprising a generally cylindrical sidewall open at one end and closed at the other end by a circular end wall. The open end of the case is closed by a cover which includes a positive terminal electrically isolated from the case. A plurality of substantially rectangular positive and negative stacked electrode plates with interleaved separator components are supported within the cell to define chordal volumes between the stacked electrode plates and the cylindrical sidewall of the cell sufficient to establish equilibrium gas pressures within the cell. The positive electrode plates are connected to the positive terminal and the negative electrode plates are electrically grounded to the case. Compressible electrolyte reservoir plates can also be provided at one or both ends of the stacked electrode plates to provide additional electrolyte during the service life of the cell and to absorb expansion of the electrode stack.

20 Claims, 1 Drawing Sheet

PLANAR METAL GAS CELL

BACKGROUND OF THE INVENTION

The present invention relates generally to pressurized secondary metal gas cells, such as, nickel hydrogen aerospace secondary storage cells. Specifically, the present invention relates to an improved secondary, metal gas, storage cell of small or miniature size and shape, commonly referred to as a button cell, except in planar configuration.

DESCRIPTION OF RELATED ART

Metal gas cells, and in particular nickel hydrogen batteries, generally include an elongated plate stack encased within a sealed metal vessel. The vessel is generally in the form of a single cylindrical vessel having dome-shaped ends and is filled with a gas under pressure, such as hydrogen. Such single cells comprise a battery when electrically linked together in either series or parallel combinations. An example of such secondary cells, useful as aerospace batteries, is disclosed in U.S. Pat. No. 4,950,564, the contents of which are hereby specifically incorporated herein by reference.

As can be seen from the referenced patent, a plurality of stacked plates are mounted together within the single containment vessel. While this particular secondary cell design is quite effective, there are certain drawbacks to this type of structure. In this design and other existing designs, the electrode plates are circular in form to conform to the cylindrical vessel and are provided with a central aperture to receive a core support member. The electrode plates are blanked out from larger rectangular materials. Accordingly, the use of circular shaped electrode plates with central apertures creates a substantial amount of scrap. Moreover, cells of such a design require a multiplicity of smaller diameter positive electrode plates utilizing multiple belleville washers to maintain proper stack compression for the long service life of the cell. This complicated design adds weight and volume to the cell. In applications where weight is a critical factor, such as, certain aerospace applications, the added weight resulting from this design is undesirable. In applications where only limited space is available, such as, small, high powered aerospace applications, the added volume can be even more undesirable than the added weight. These and other disadvantages associated with such cells were solved by my planar cell invention set forth in my copending U.S. patent application, Ser. No. 07/926,062, filed Aug. 5, 1992, the contents of which are hereby specifically incorporated herein by reference.

SUMMARY OF THE INVENTION

My present invention relates to the use of the basic planar design concepts of my copending application in a novel and unobvious way in small to miniature pressurized secondary cells of "button cell configuration". Pressurized metal gas button cell vessels typically have cylindrical sidewalls, are closed at each end and contain stacked electrode plates and separator materials. One end of the cell has a positive terminal electrically connected to the positive electrode plates in the plate stack and isolated from the rest of the cylindrical vessel. The negative electrode plates of the plate stack are grounded to the vessel.

Metal gas cells, such as nickel hydrogen cells, do not perform well at pressures above 1000 psig. Accordingly, there is a need to maintain the pressures within such cells below 1000 psig and preferably below 900 psig. Metal gas cells, such as nickel hydrogen cells require significant free void volume to stabilize operating pressures at 900 psig or below. The present invention, through the use of substantially rectangular electrode plates, provides a button cell with four chordal volumes defined between the stacked electrode plates and the cylindrical sidewall of the vessel. These chordal volumes provide significant free volume within the cell vessel to establish gas equilibrium pressures within the cell near or below the 900 psig optimum pressure.

The stacked electrode plates are also preferably provided with an electrolyte reservoir plate at one or both ends of the stacked electrode plates. The electrolyte reservoir plates serve two functions. First, the electrolyte reservoir plates are compressible and absorb the expansion of the positive electrode plates in the plate stack which occurs during the service life of the cell. As the electrolyte reservoir plate is compressed, electrolyte contained within the electrolyte reservoir plate is released into the pack wick covering the stacked electrode plates and electrolyte reservoir plate(s). Accordingly, the pressures exerted on the ends of the cell vessel by the plate stack within the cell are controlled and the cell operates wetter than other cells which do not incorporate the use of electrolyte reservoir plates.

For decreasing cell diameters, e.g. two inches or below, several different design considerations begin to dominate the planar cell design of my copending application. First, the practical and useful working volume of the respective plate stack decreases in less proportion than the decrease in diameter of the cell vessel such that the resultant four chordal volumes begin to dominate the free void volume. Characteristically, the cell operating pressures show a similar decrease. Thus, the external face pressure of the pressure vessel end discs that must be resolved, or reacted against, by the battery structure decreases rapidly due to the decreasing face diameters of the vessel and the intrinsically decreasing cell operating pressures. Second, the very small component sizes of the plate stack combined with the mass and volume of the basic planar terminal and seal design result in a less efficient cell and increasingly complex fabrication techniques. Third, decreasing cell sizes result in substantially reduced obstacles to thermal flow and electrical currents for typical charge and discharge regimes.

The small to miniature pressurized metal gas button cell of the present invention successfully resolves the three above discussed design considerations. The metal gas button cells of the present invention are typically two inches or less in diameter and have a diameter at least twice and generally three times the axial length of the cell. The construction of the cell is simplified with one termination of the plate stack, typically positive, affixed to or integral with one of the end discs of the cell vessel and the other termination of the plate stack, typically negative, electrically grounded to the other end disc. In a one inch diameter cell, the button cell design results in significant weight savings, about one-third, even over the planar cell design of my above referenced copending application. In addition, whereas the cell envelope and energy density remain basically unchanged for the one inch diameter cell, the specific energy is proportionally increased.

DETAILED DESCRIPTION OF THE PREFERRED EMBODIMENTS

Figure 1:
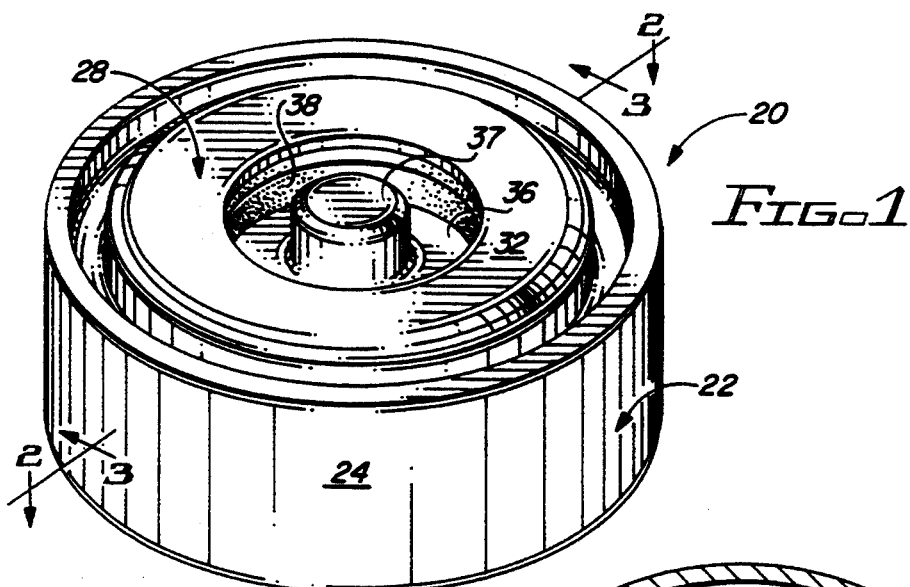
FIG. 1 is a perspective view of a pressurized, metal gas, secondary button cell utilizing substantially rectangular electrode plates and at least one compressible electrolyte reservoir plate.
Figure 2:
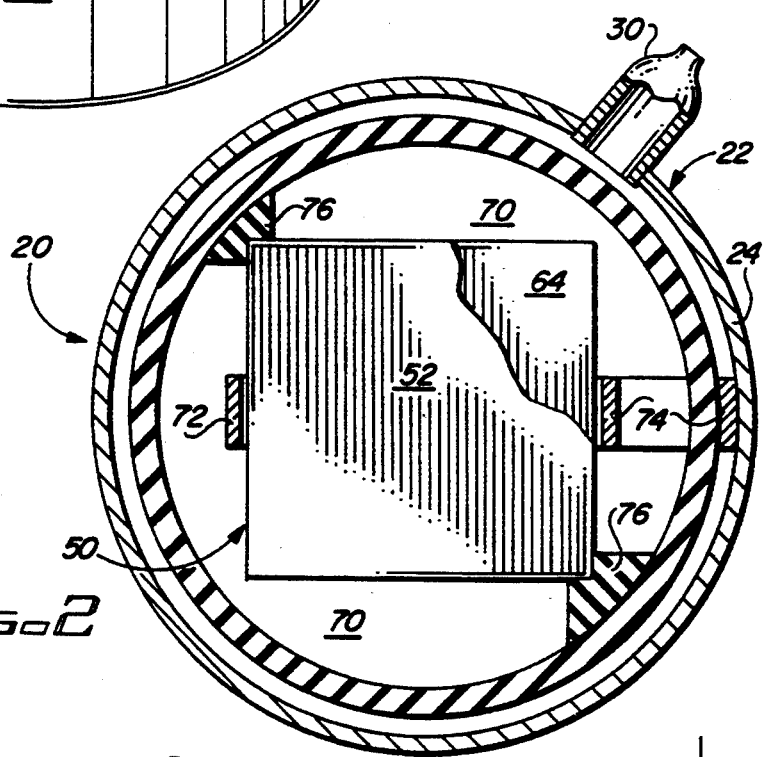
FIG. 2 is a horizontal cross-sectional view taken substantially along lines 2—2 of FIG. 1 and showing the substantially rectangular electrode plates used in the metal gas button cell of the present invention.
Figure 3:
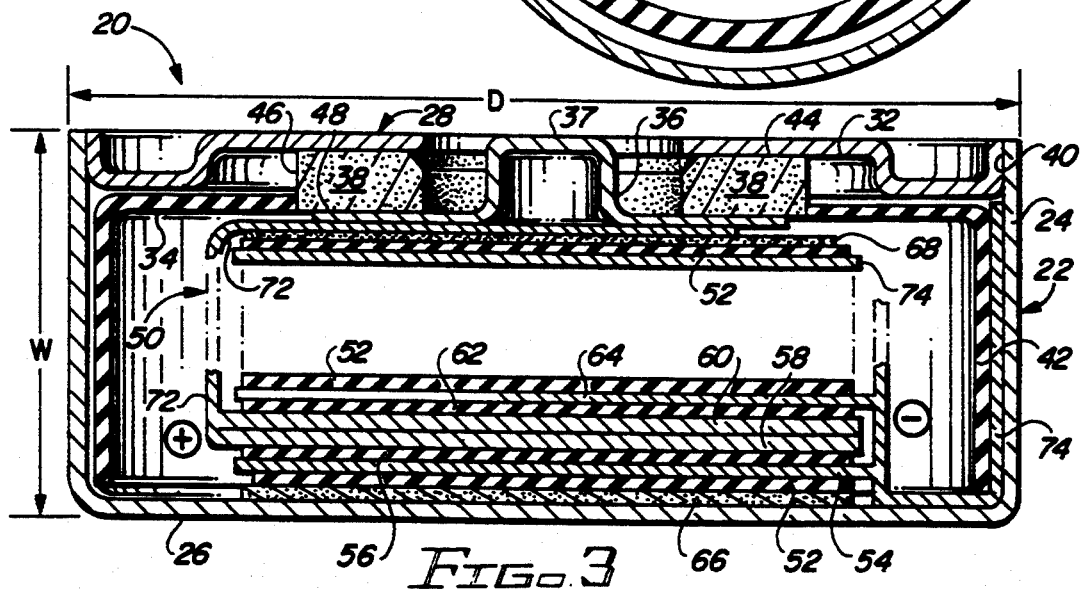
FIG. 3 is a vertical cross-sectional view taken substantially along lines 3—3 of FIG. 1, showing the electrode plates and the electrolyte reservoir plates within the metal gas button cell of the present invention.

Referring to FIGS. 1 to 3, a secondary, metal gas, button cell 20 is illustrated. The cell 20 includes a case 22 with a generally cylindrical sidewall 24. The case 22 is closed at one end by a circular end wall 26 and open at the opposite end. The open end of the case 22 is closed by a circular cover 28. The cylindrical sidewall 24, the end wall 26 and the cover 28 are thin walled metal capable of containing a gas under a pressure, e.g. 900 psig, suitable for operation of the button cell. The metal utilized for the button cell 20 may be of any suitable light weight material, such as, high nickel content alloys.

As shown in FIGS. 1 and 3, the outer diameter D of the case 22 is substantially greater than the axial length L of the case. The small or miniature button cell 20 of the present invention is typically two inches or less in diameter. The ratio of the diameter D of the case 22 to the length L of the case is normally at least 2 to 1 and generally 3 to 1.

The case 22 is provided with a fill tube 30 for filling the button cell 20 with electrolyte after the cell has been assembled. As shown in FIG. 2, the fill tube is mounted in and passes through the sidewall 24 of the case 22.

As shown in FIG. 3, the cover 28 comprises an outer annular member 32, a circular terminal disc 36 with a central cylindrical raised portion 37, and an annular ceramic member 38 to electrically isolate the circular terminal 36 from the outer annular member 32 of the cover 28 and the case 22. The central cylindrical raised portion 37 of the circular terminal 36 extends upwardly through central openings in the metallic annular member 32 and the annular ceramic member 38.

An outer peripheral wall 40 of the annular member 32 is welded to the inner surface of the case sidewall 24 adjacent the open end of the case. The weld not only secures the cover 28 to the case 22, it also forms a hermetic seal between the cover and the inner surface of the case capable of withstanding the gaseous pressures within the button cell 20.

As best shown in FIG. 3, the annular ceramic member 38 has an upper surface 44 which is secured to the underside of the outer annular member 32 adjacent the central opening of the member. The underside 48 of the annular ceramic member is secured to the circular terminal disc 36 thereby interconnecting the annular member 32 and the terminal disc 36 to form the cover 28 while electrically isolating the terminal disc 36 from the annular member 32 of the cover 28 and the case 22. The annular ceramic member 38 is secured to the other components of the cover 28 by means of a hermetic ceramic-to-metal seal which is formed by conventional fabricating techniques.

A plate stack 50 is supported within the button cell 20 between the end wall 26 of the case 22 and the cover 28. While not shown for the sake of clarity, the plate stack 50 is wrapped and enclosed within a conventional pack wick of nonwoven separator material. The pack wick material carries electrolyte to and from the plate stack 50.

A polypropylene wrapper 34, surrounding the plate stack and pack wick, has a cylindrical sidewall 42 which serves to ensure that the sides of the plate stack 50 are electrically isolated from the sidewall 24 of the cell. The outer diameter of the polypropylene wrapper sidewall 42 is less than the inner diameter of the case or cell sidewall 24. Accordingly, there is an annular space between the case sidewall 24 and the wrapper sidewall 42 through which electrolyte can pass from the fill tube 30 into the interior of the cell when the cell is charged with electrolyte.

As illustrated in FIG. 3, the plate stack 50 consists of one or more repetitive electrode sets with each set comprising a gas screen 52, a negative electrode plate 54, a separator 56, positive electrode plates 58 and 60, a separator 62 and a negative electrode plate 64. The number of repetitive sets used in a cell (one or more) is determined by the desired capacity of the button cell 20. The electrolyte in the button cell 20 and the materials used for the positive and negative electrode plates, the gas screens and the separators in the button cell 20 are well known in the art and include those disclosed in the referenced U.S. Pat. No. 4,950,564. Accordingly, the materials of the plate stack which are enclosed within the pack wick and wrapper 34, excluding the electrolyte reservoir plate(s), will not be discussed in any further detail herein. It should also be understood that while a particular repetitive electrode set has been disclosed, other conventional repetitive electrode sets can be used in the button cell of the present invention.

The plate stack 50 includes an electrolyte reservoir plate 66 at one end of the plate stack between the case end wall 26 and a first repetitive electrode set. The plate stack can also include a second electrolyte reservoir plate 68 at the other end of the plate stack 50 between the cover 28 and a last repetitive electrode set. The electrolyte reservoir plates are enclosed within the wick pack and wrapper with the repetitive electrode sets. The electrolyte reservoir plates 66 and 68 are preferably made of a porous metallic material such as porous nickel in the form of a nickel foam, nickel felt and/or nickel sponge. The porosity of the nickel material is preferably 75%–95% void volume.

As shown in FIG. 2 the electrode plates, gas screens, separators and electrolyte reservoir plates are all rectangular and preferably square shaped as opposed to the circular shape typically used in prior art button cells. The rectangular shape of the electrode plates, gas screens, separators and electrolyte reservoir plates reduces the amount of waste material created when the components are formed or stamped from larger rectangular sheet materials. In addition, the rectangular shape of the plate stack 50 creates a plurality of relatively large chordal void volumes 70 between the plate stack 50 and the sidewall 24 of the cell vessel. These chordal void volumes are necessary to establish equilibrium pressures within the button cell 20 consistent with particular electrochemical couple provided within the cell 20.

The positive electrode plates 58 and 60 of each repetitive set are electrically connected to the circular terminal disc 36 by a tab or tabs 72. The negative electrode plates 54 and 64 of each repetitive set are electrically grounded to the case 22 by tab or tabs 74.

The plate stack 50, including the electrolyte reservoir plate(s) which are also enclosed within the wrapper, are normally maintained in position by being held in compression between the cover 28 and the end wall 26 of the button cell. The plate stack 50 can also be maintained in position by press fitting opposed corners of the plate stack components within internal pack support brackets 76 shown in FIG. 2.

After the cell 20 is assembled, a vacuum is drawn down on the cell through the fill tube 30. An appropriate electrolyte, such as potassium hydroxide, is then back flowed into the cell and the fill tube is closed and sealed. During the service life of the button cell 20, the chordal void volumes 70 permit the establishment of equilibrium gas pressures within the cell 20. The compressible electrolyte reservoir plate 66 and compressible electrolyte reservoir plate 68, if two reservoir plates are used, accommodate the expansion of the positive electrode plates within the plate stack 50 during the service life of the button cell while maintaining a positive pressure between the plate stack 50 and the cell end walls to maintain the plate stack in position. As the electrolyte reservoir plate or plates are compressed by the expansion of the positive electrode plates, the electrolyte reservoir plates supply additional electrolyte to the plate stack 50 as required during long term cycling of the button cell.

While certain representative embodiments and details had been shown for the purpose of illustrating the invention, it will be apparent to those skilled in this art that various changes and modifications may be made therein without departing from the spirit or scope of the invention. The invention illustratively disclosed herein suitably may be practiced in the absence of any element which is not specifically disclosed herein.

What is claimed is:

1. A planar metal gas cell comprising:
a hermetically sealed case having a generally cylindrical sidewall, a circular end wall closing a first end of said case, and an open end; the axial length of said case being substantially less than the diameter of said case;
a circular cover secured to said sidewall adjacent said open end of said case and closing said open end of said case; said circular cover including a positive terminal electrically isolated from said case;
a pressurized gas within said cell;
a plurality of substantially rectangular positive and negative stacked electrode plates with interleaved separator components within said cell;
means supporting said stacked electrode plates within said cell between said circular end wall of said case and said circular cover to define chordal volumes between said stacked electrode plates and said cylindrical sidewall of said case sufficient to establish optimum equilibrium gas pressures within said cell;
means electrically connecting said positive electrode plates to said positive terminal; and
means electrically grounding said negative electrode plates to said case.

2. The metal gas cell of claim 1, wherein: said metal gas cell includes a compressible electrolyte reservoir plate of porous nickel impregnated with electrolyte disposed inwardly of said circular end wall of said case.

3. The metal gas cell of claim 2, wherein: said metal gas cell includes a second compressible electrolyte reservoir plate of porous nickel impregnated with electrolyte disposed inwardly of said circular cover.

4. The metal gas cell of claim 2, wherein: the porosity of said nickel electrode reservoir plate is sufficient to provide additional electrolyte to said positive electrode plates as required during long term cycling of the cell.

5. The metal gas cell of claim 1, wherein: means is provided between said circular end wall of said case and said circular cover to relieve pressure caused by expansion of said positive electrode plates during long term cycling of said cell.

6. The metal gas cell of claim 5, wherein: said means to relieve pressure caused by the expansion of said positive electrode plates is a compressible electrolyte reservoir plate of porous nickel impregnated with electrolyte disposed inwardly of said circular end wall of said case.

7. The metal gas cell of claim 1, wherein: said means supporting said stacked electrode plates within said cell are configured to hold said stacked electrode plates in compression.

8. The metal gas cell of claim 1, wherein: said means supporting said stacked electrode plates comprises a pair of pack support members which support a pair of opposed corners on each of said electrode plates.

9. The metal gas cell of claim 1, wherein: the diameter of said cell is at least twice the axial length of said cell.

10. A planar metal gas cell comprising:
a case having a generally cylindrical sidewall, a circular end wall closing a first end of said case, and an open end; the axial length of said case being substantially less than the diameter of said case;
a circular cover secured to said sidewall adjacent said open end of said case and closing said open end of said case; said circular cover including a positive terminal electrically isolated from said case;
a plurality of substantially rectangular positive and negative stacked electrode plates with interleaved separator components within said cell;
means supporting said stacked electrode plates within said cell between said circular end wall of said case and said circular cover to define chordal volumes between said stacked electrode plates and said cylindrical sidewall of said case for establishing optimum equilibrium gas pressures within said cell when said cell has been filled with gas;
means electrically connecting said positive electrode plates to said positive terminal; and
means electrically grounding said negative electrode plates to said case.

11. The metal gas cell of claim 10, wherein: said metal gas cell includes a compressible electrolyte reservoir plate of porous nickel impregnated with electrolyte and disposed inwardly of said circular end wall of said case.

12. The metal gas cell of claim 11, wherein: said metal gas cell includes a second compressible electrolyte reservoir plate of porous nickel impregnated with electrolyte and disposed inwardly of said circular cover.

13. The metal gas cell of claim 11, wherein: the porosity of said nickel electrolyte reservoir plate is sufficient to provide additional electrolyte to said positive electrode plates as required during long term cycling of the cell.

14. The metal gas cell of claim 10, wherein: means is provided between said circular end wall of said case and said circular cover to relieve pressure caused by expansion of said positive electrode plates during long term cycling of said cell.

15. The metal gas cell of claim 14, wherein: said means to relieve pressure caused by the expansion of said positive electrode plates is a compressible electrolyte reservoir plate of porous nickel impregnated with electrolyte and disposed inwardly of said circular end wall of said case.

16. The metal gas cell of claim 10, wherein: said means supporting said stacked electrode plates within said cell are configured to hold the stacked electrode plates in compression.

17. The metal gas cell of claim 10, wherein: said means supporting said stacked electrode plates comprises a pair of pack support members which support a pair of opposed corners on each of said electrode plates.

18. The metal gas cell of claim 10, wherein: said diameter of said cell is at least twice the axial length of said cell.

19. The metal gas cell of claim 10, wherein: said circular cover has a cylindrical sidewall and said chordal volumes are defined between said stacked electrode plates and said cylindrical sidewall of said circular cover.

20. The metal gas cell of claim 1, wherein: said circular cover has a cylindrical sidewall and said chordal volumes are defined between said stacked electrode plates and said cylindrical sidewall of said circular cover.

* * * * *